US008415929B2

(12) United States Patent
Tabuta

(10) Patent No.: US 8,415,929 B2
(45) Date of Patent: Apr. 9, 2013

(54) BATTERY CHARGING CIRCUIT

(75) Inventor: Makoto Tabuta, Hanno (JP)

(73) Assignee: Shindengen Electric Manufacturing, Tokyo (JP)

( * ) Notice: Subject to any disclaimer, the term of this patent is extended or adjusted under 35 U.S.C. 154(b) by 0 days.

(21) Appl. No.: 12/865,941

(22) PCT Filed: Feb. 5, 2009

(86) PCT No.: PCT/JP2009/051966
§ 371 (c)(1),
(2), (4) Date: Aug. 3, 2010

(87) PCT Pub. No.: WO2009/099144
PCT Pub. Date: Aug. 13, 2009

(65) Prior Publication Data
US 2010/0327817 A1 Dec. 30, 2010

(30) Foreign Application Priority Data
Feb. 6, 2008 (JP) ................ P2008-026818

(51) Int. Cl.
*H02J 7/04* (2006.01)
*H02J 7/00* (2006.01)
(52) U.S. Cl.
USPC ............ 320/148; 320/155; 320/160
(58) Field of Classification Search .......... 320/148
See application file for complete search history.

(56) References Cited

U.S. PATENT DOCUMENTS 5,355,071 A * 10/1994 Ishida et al. ........... 320/110
5,686,815 A * 11/1997 Reipur et al. ........... 320/116
6,215,271 B1   4/2001 Lerow et al.
6,362,603 B2 *  3/2002 Suzuki et al. ........... 320/163
6,392,384 B1 *  5/2002 Hwang Bo et al. ...... 320/116
7,012,405 B2 *  3/2006 Nishida et al. .......... 320/137
2005/0264265 A1 12/2005 Iijima et al.
2006/0145658 A1 * 7/2006 Wang ..................... 320/107
2008/0007227 A1 * 1/2008 Noda ..................... 320/160
2008/0203967 A1 * 8/2008 Krieger et al. .......... 320/105

FOREIGN PATENT DOCUMENTS

| CN | 1702938 | 11/2005 |
|---|---|---|
| CN | 200944534 | 9/2007 |
| JP | 10-070851 | 3/1998 |
| JP | 2000-278897 | 10/2000 |

(Continued)

OTHER PUBLICATIONS

English translation of Taiwan Office Action in SN 098103561.

(Continued)

*Primary Examiner* — Yalkew Fantu
(74) *Attorney, Agent, or Firm* — Nixon & Vanderhye, P.C.

(57) ABSTRACT

An example battery charging circuit includes a rectifier circuit for rectifying a three-phase AC voltage outputted from an electric power generator and generating a charge voltage for charging a battery. A voltage detection circuit detects that the voltage of the battery exceeds a predetermined voltage. A switching circuit, in an off-state, charges the battery through the rectifying circuit and, in an on-state, short-circuits the electric power generator through the rectifier circuit. A switch control circuit brings the switching circuit into the on-state, when it is detected by the voltage detection circuit that the voltage of the battery exceeds the predetermined voltage. A control circuit allows the switch control circuit to subsequently perform a control for bringing the switching circuit into the off-state.

1 Claim, 4 Drawing Sheets

FOREIGN PATENT DOCUMENTS

| | | | |
|---|---|---|---|
| JP | 2001-231180 | * | 8/2001 |
| JP | A-2001-231180 | | 8/2001 |
| JP | 2001-251781 | | 9/2001 |

OTHER PUBLICATIONS

International Search Report for PCT/JP2009/051966, mailed Apr. 7, 2009.

English translation of JP Office Action in SN 2008-026818 mailed Mar. 13, 2012.

Office Action dated Apr. 10, 2012 in Taiwan Application No. 098103561 and English-language translation thereof.

Office Action dated Dec. 4, 2012 in Chinese Application No. 200980103889.3 and English-language translation of search report thereof.

* cited by examiner

US 8,415,929 B2

BATTERY CHARGING CIRCUIT

This application is the U.S. national phase of International Application No. PCT/JP2009/051966, filed 5 Feb. 2009, which designated the U.S. and claims priority to Japanese application no. 2008-026818, filed 6 Feb. 2008, the entire contents of each of which are hereby incorporated by reference.

TECHNICAL FIELD

The present invention relates to a battery charging circuit that rectifies an AC (Alternate Current) voltage and charges a battery.

Priority is claimed on Japanese Patent Application No. 2008-26818, filed Feb. 6, 2008, the content of which is incorporated herein by reference.

BACKGROUND

FIG. 3 is a circuit diagram illustrating a structure of a conventional battery charging circuit (see, for example, Non-Patent Document 1). FIG. 4A illustrates current waveforms of an electric power generator. FIG. 4B illustrates voltage waveforms of the electric power generator. Hereinafter, an operation of the conventional battery charging circuit is explained with reference to FIGS. 3, 4A, and 4B.

Hereinafter, a circuit operation, when a voltage $V_B$ of a battery B is low (the battery B is not sufficiently charged), specifically, when the voltage $V_B$ is lower than a predetermined voltage determined based on a breakdown voltage of a zener diode ZD1, is explained. In a voltage detection circuit 4, a reverse current (from a cathode of the battery B to an anode of the battery B) does not flow in the zener diode ZD1. For this reason, a current does not flow between a base and an emitter of a transistor Q1. Therefore, the transistor Q1 changes to the off-state. In this case, in a switch control circuit 5, a current does not flow between a base and an emitter of a transistor Q2. Therefore, the transistor Q2 also changes to the off-state. Since a gate current of each of thyristors S1 to S3 is zero in a switching circuit 3, the switching circuit 3 switches to the off-state (in which a current does not flow from an anode to a cathode). Accordingly, a three-phase AC voltage outputted from an electric power generator 1 is rectified by each of diodes D1 to D6, and thus the battery B is charged with the rectified voltage as a charge voltage (FIG. 4B).

Hereinafter, a circuit operation, when the battery B is sufficiently charged and the voltage $V_B$ thereof becomes higher than the predetermined voltage, is explained. In the voltage detection circuit 4, a reverse current from the battery B to the zener diode ZD1 flows. Accordingly, the transistor Q1 changes to the on-state. Then, a current flows between the base and the emitter of a transistor Q2 in the switch control circuit 5, and therefore the transistor Q2 also changes to the on-state. Since a gate current flows in each of the thyristors S1 to S3 through the transistor Q2 and the resistors R1 to R3, each of the thyristors S1 to S3 changes to the on-state (in which the current flows from the anode to the cathode). Therefore, the three phases of the electric power generator 1 are short-circuited through the diodes D4 to D6, respectively. Consequently, the battery B changes to a non-charged state.

[Non-Patent Document 1] Japanese Unexamined Patent First Publication No. H10-70851

SUMMARY

Among the three thyristors S1 to S3 provided for the respective three phases, the impedance differs between a phase connected to the on-state thyristor (short-circuit phase) and a phase connected to the off-state thyristor (charging phase). For this reason, a large current flows only in a path corresponding to the short-circuit phase (phase U shown in FIG. 4A), and a small current flows in a path corresponding to the charging phase (phases V and W shown in FIG. 4A). For this reason, a current bias occurs among the three phases. If a signal is in/putted to a gate of the thyristor, the thyristor changes to the on-state, and then a current flows between the anode and the cathode of the thyristor. If a current flowing in the electric power generator becomes negative and therefore a current stops flowing in the thyristor, the thyristor changes to the off-state. Since the thyristor is a semiconductor, it takes a time for the electric charge to be released until the thyristor completely changes to the off-state. If the current flowing in the electric power generator becomes positive before the time is prepared, the thyristor does not change to the off-state and maintains the conduction-state, and therefore the thyristor cannot change to the off-state (phase U shown in FIG. 4). If the phase U cannot change to the off-state, the phases V and W maintain the off-state. In this case, the positive currents in the phases V and W become small as can be understood from FIG. 4, and therefore a problem that a current for charging the battery becomes insufficient arises.

The present invention is made in view of the above situations. An object of the present invention is to provide a battery charging circuit that can properly control the switching circuit that switches charging and non-charging of the battery in order to efficiently charge the battery.

According to a first aspect of the present invention, a battery charging circuit includes: a rectifier circuit that rectifies a three-phase alternate-current voltage outputted from an electric power generator and generates a charge voltage for charging a battery; a voltage detection circuit that detects that a voltage of the battery becomes equal to or higher than a predetermined voltage; a switching circuit that charges, in an off-state, the battery through the rectifier circuit and that short-circuits, in an on-state, the electric power generator through the rectifier circuit; a switch control circuit that switches the switching circuit to the on-state when the voltage detection circuit detects that the voltage of the battery becomes equal to or higher than the predetermined voltage; and a control circuit that controls the switching circuit to switch from the on-state to the off-state and to maintain the off-state. The control circuit includes a capacitor that is charged when the switch control circuit controls the switching circuit to switch to the on-state, the capacitor discharging when the switch control circuit controls the switching circuit to switch to the off-state. The voltage detection circuit includes a first transistor, a base of the first transistor being reverse-biased by the capacitor discharging, and the switch control circuit comprises a second transistor, a base of the second transistor being connected to a collector of the first transistor, the switch control circuit controlling the on-state and the off-state of the switching circuit based on a collector current through the collector.

According to a second aspect of the present invention, a battery charging circuit includes: a rectifier circuit that rectifies a three-phase alternate-current voltage outputted from an electric power generator and generates a charge voltage for charging a battery; a voltage detection circuit that detects that a voltage of the battery becomes equal to or higher than a predetermined voltage; a switching circuit that charges, in an off-state, the battery through the rectifier circuit and that short-circuits, in an on-state, the electric power generator through the rectifier circuit; a switch control circuit that switches the switching circuit to the on-state when the voltage detection circuit detects that the voltage of the battery becomes equal to or higher than the predetermined voltage; and a control circuit that controls the switching circuit to maintain the on-state when the switching circuit is in the on-state and to maintain the off-state when the switching circuit is in the off-state. The control circuit includes a capacitor that is charged when the switch control circuit controls the switching circuit to switch to the on-state, the capacitor discharging when the switch control circuit controls the switching circuit to switch to the off-state. The voltage detection circuit includes a first transistor, a base of the first transistor being reverse-biased by the capacitor discharging. The switch control circuit includes a second transistor, a base of the second transistor being connected to a collector of the first transistor, the switch control circuit controlling the on-state and the off-state of the switching circuit based on a collector current through the collector.

According to the present invention, control for changing the switching circuit to the off-state is continuously performed. For this reason, the switching circuit can properly switch from the on-state to the off-state during the continuous control. Therefore, a case, in which the switching circuit is always in the on-state and the battery is charged only in the phase in which a small current flows, can be prevented, and the battery can be efficiently charged.

Figure 1:
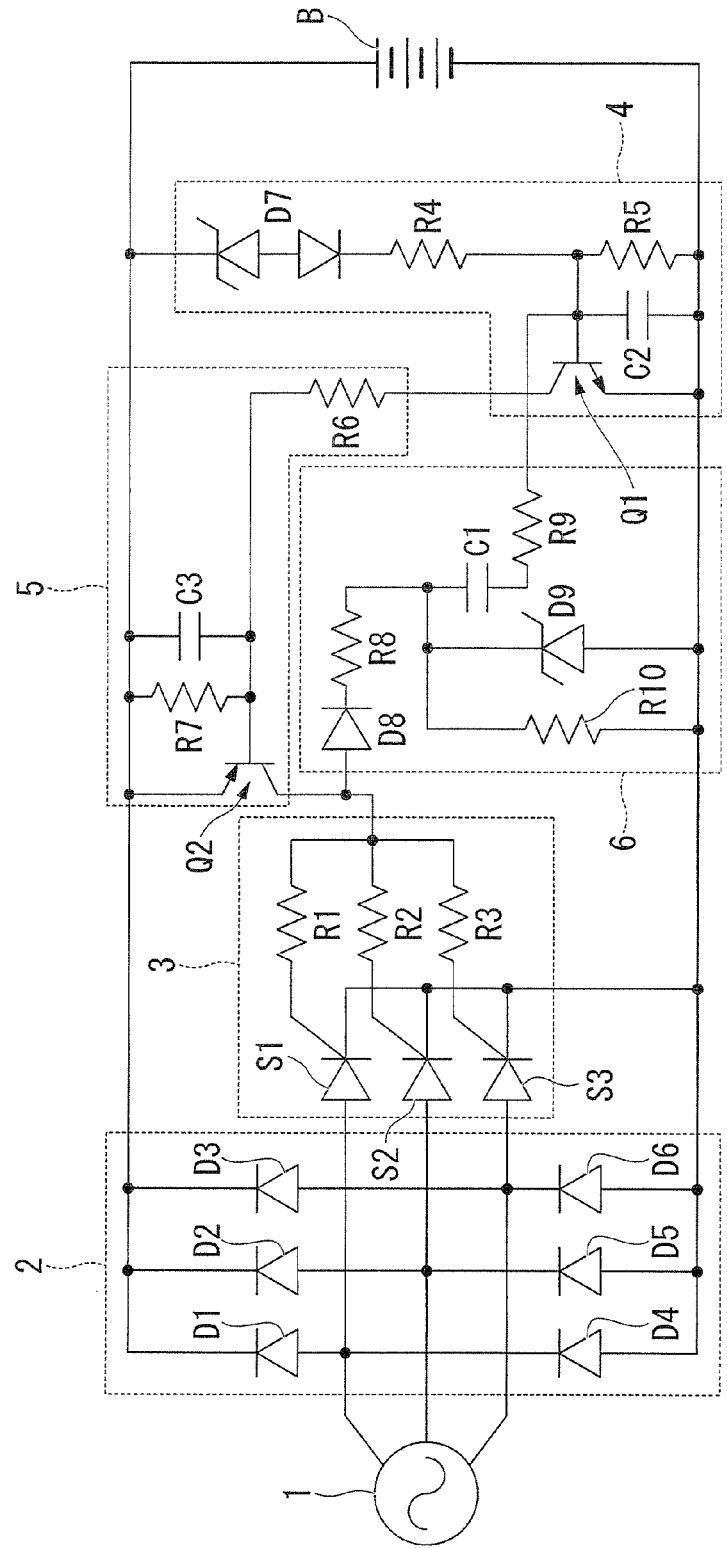
FIG. 1 is a circuit diagram illustrating a structure of a battery charging circuit according to a first embodiment of the present invention.

DESCRIPTION OF REFERENCE SYMBOLS 1 electric power generator
2 rectifier circuit
3 switching circuit
4 voltage detection circuit
5 switch control circuit
6 control circuit
B battery
D1 to D8 diode
S1 to S3 thyristor
ZD1 and ZD2 zener diode
Q1 and Q2 transistor
R1 to R10 resistor
C1 to C3 capacitor

DETAILED DESCRIPTION OF EXAMPLE EMBODIMENTS

Hereinafter, embodiments of the present invention are explained in detail with reference to accompanying drawings.

FIG. 1 is a circuit diagram illustrating a structure of a battery charging circuit according to a first embodiment of the present invention. The battery charging circuit includes: a rectifier circuit 2 that rectifies a three-phase (phases U, V, and W) AC voltage outputted from an electric power generator 1 and generates a charge voltage for charging a battery B; a voltage detection circuit 4 that detects that a voltage of the battery B becomes equal to or higher than a predetermined voltage; a switching circuit 3 that charges, in an off-state, the battery B through the rectifier circuit 2, and short-circuits, in an on-state, the electric power generator 1 through the rectifier circuit 2; a switch control circuit 5 that, when the voltage detection circuit 4 detects that the voltage of the battery B becomes equal to or higher than the predetermined voltage, switches the switching circuit 3 to the on-state; and a control circuit 6 that controls the switching circuit 3 to maintain the on-state when the switching circuit 3 is in the on-state and to maintain the off-state when the switching circuit 3 is in the off-state.

The electric power generator 1 generates the three-phase AC voltage for charging the battery B. The three-phase AC voltage includes the phases U, V, and W.

The rectifier circuit 2 includes diodes D1 to D6. An anode of the diode D1 and a cathode of the diode D4 are connected to the phase U of the electric power generator 1. An anode of the diode D2 and a cathode of the diode D5 are connected to the phase V of the electric power generator 1. An anode of the diode D3 and a cathode of the diode D6 are connected to phase W of the electric power generator 1. Cathodes of the diodes D1 to D3 are connected to a cathode of the battery B. Anodes of the diodes D4 to D6 are connected to an anode of the battery B.

The switching circuit 3 includes thyristors S1 to S3 and the resistors R1 to R3. Anodes of the thyristors S1 to S3 are connected to the phases U, V, and W of the electric power generator 1, respectively. Cathodes of the thyristors S1 to S3 are connected to the anodes of the diodes D4 to D6, respectively. One ends of the resistors R1 to R3 are connected to gates of the thyristors S1 to S3, respectively. The other ends of the resistors R1 to R3 are connected to the switch control circuit 5 and the control circuit 6.

The voltage detection circuit 4 includes: a zener diode ZD1, a cathode of the zener diode ZD1 being connected to the cathode of the battery B; a diode D7, an anode of the diode D7 being connected to the anode of the zener diode ZD1; a resistor R4, one end of the resistor R4 being connected to the cathode of the diode D7; a transistor Q1, a base of the transistor Q1 being connected to the other end of the resistor R4, and an emitter of the transistor Q1 being connected to the anode of the battery B; and a resistor R5 and a capacitor C2 that are connected in parallel between a base and an emitter of the transistor Q1. A collector of the transistor Q1 is connected to the switch control circuit 5.

The switch control circuit 5 includes: a resistor R6, one end of the resistor R6 being connected to the collector of the transistor Q1; a transistor Q2, a base of the transistor Q2 being connected to the other end of the resistor R6, and an emitter of the transistor Q2 being connected to the cathode of the battery B; and a resistor R7 and a capacitor C3 that are connected in parallel between the base and the emitter of the transistor Q2. A collector of the transistor Q2 is connected to the resistors R1 to R3 in the switching circuit 3 and to the control circuit 6.

The control circuit 6 includes: a capacitor C1; a diode D8; a zener diode ZD2; and resistors R8 to R10. The capacitor C1 is provided between the collector of the transistor Q2 and the base of the transistor Q1. The diode D8 is provided between the transistor Q2 and the capacitor C1 such that the anode of the diode D8 is connected to the collector of the transistor Q2. The resistor R8 is provided between the capacitor C1 and the diode D8. The resistor R9 is provided between the capacitor C1 and the base of the transistor Q1. The cathode of the zener diode ZD2 is connected to a connecting point of the capacitor C1 and the resistor R8. The anode of the zener diode ZD2 is connected to the anode of the battery B. The resistor R10 and the zener diode ZD2 are connected in parallel.

Figure 2A:
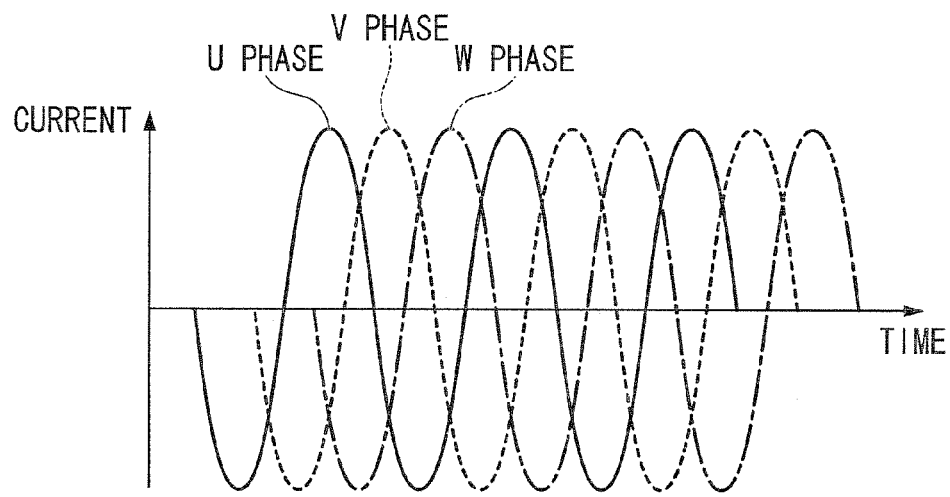
FIG. 2A illustrates current waveforms of an electric power generator shown in FIG. 1.
Figure 2B:
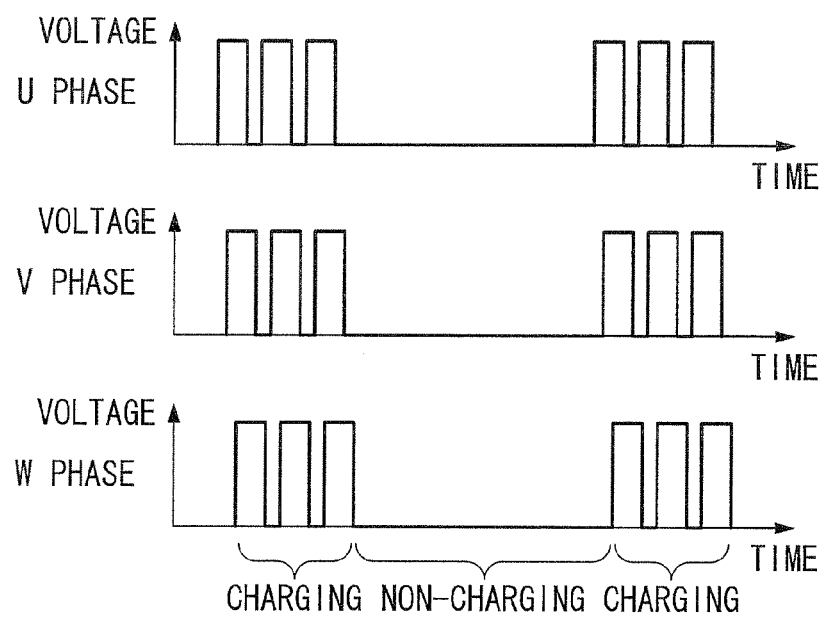
FIG. 2B illustrates voltage waveforms of the electric power generator shown in FIG. 1.
Figure 3:
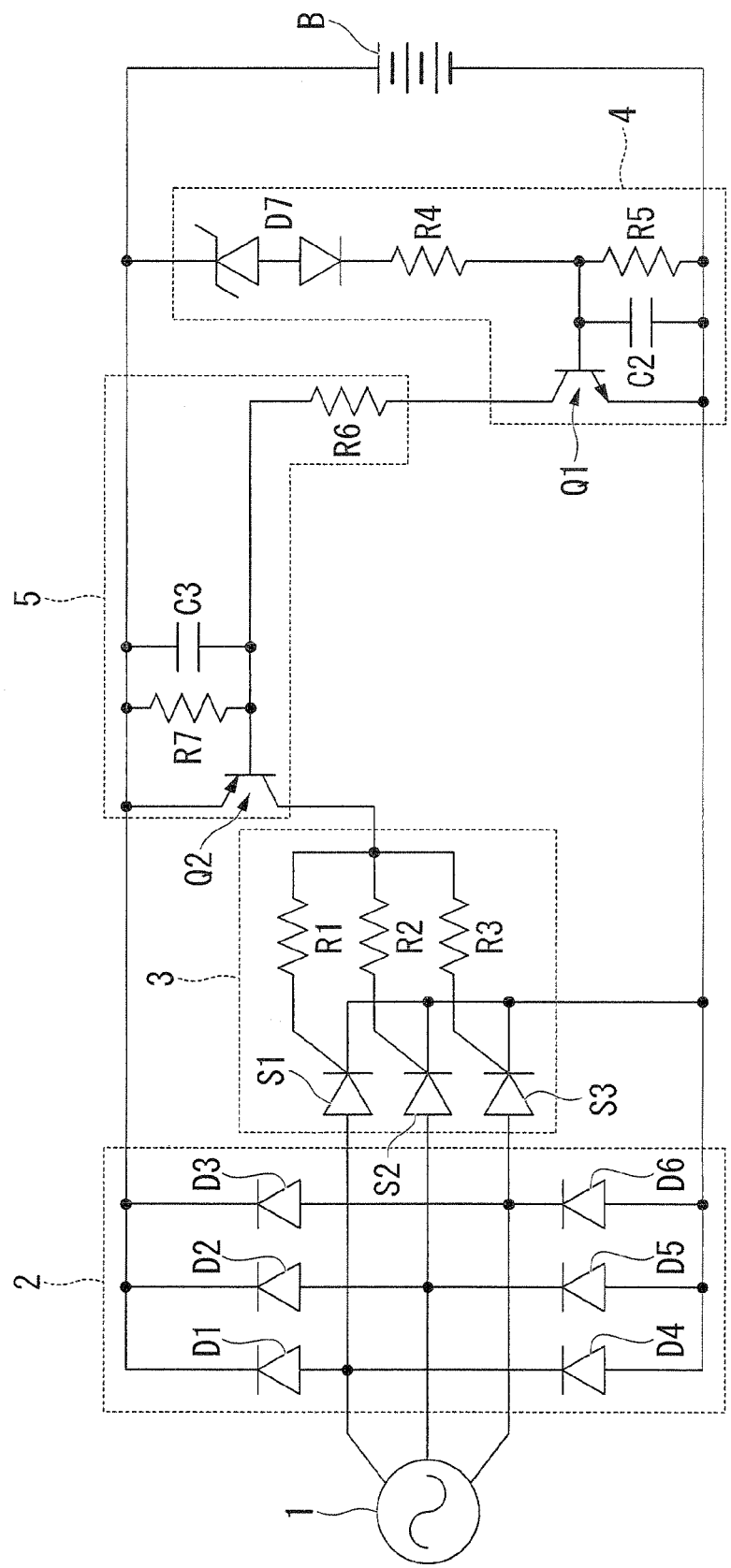
FIG. 3 is a circuit diagram illustrating a structure of a battery charging circuit of a related art.
Figure 4A:
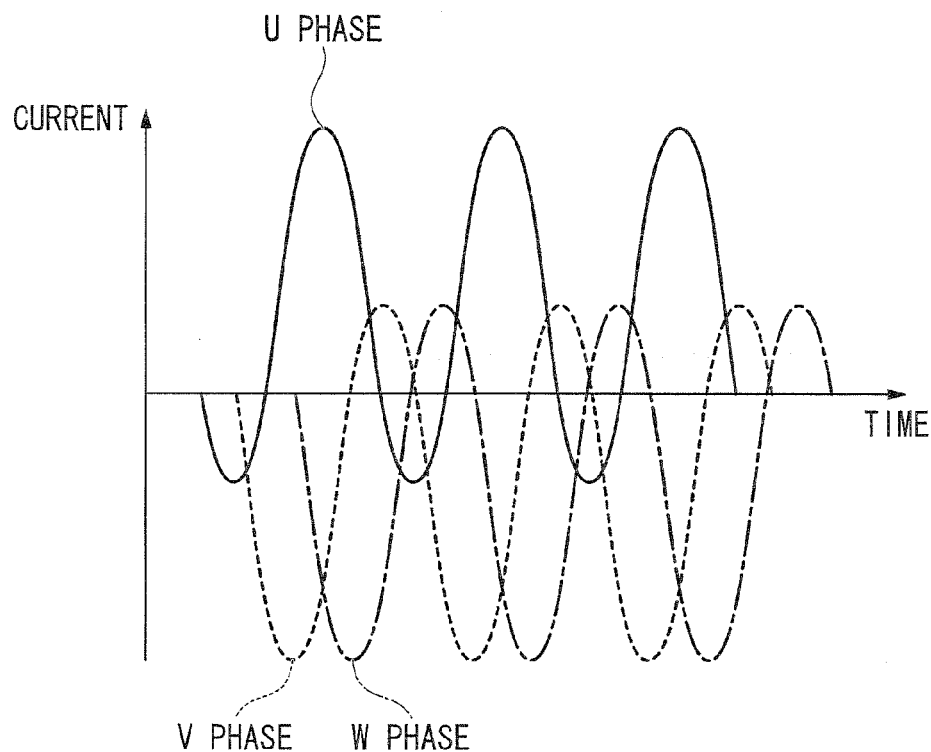
FIG. 4A illustrates current waveforms of an electric power generator shown in FIG. 3.
Figure 4B:
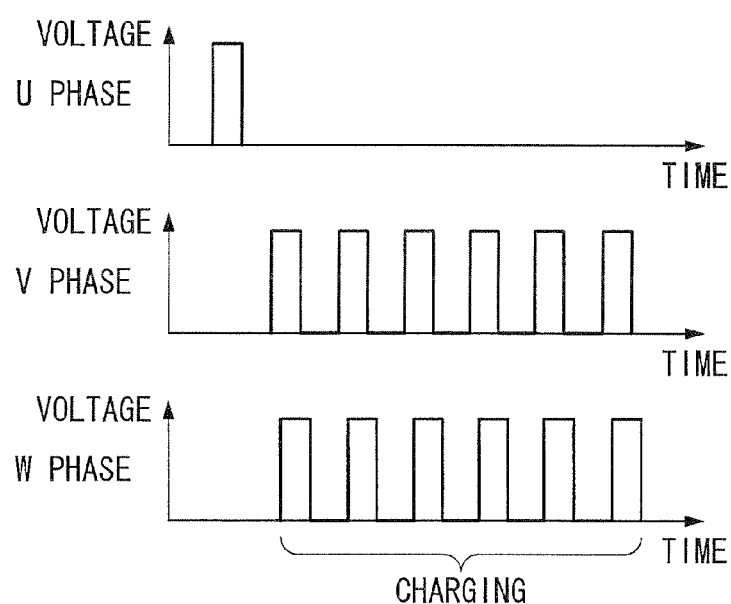
FIG. 4B illustrates voltage waveforms of the electric power generator shown in FIG. 3.

Hereinafter, an operation of the battery charging circuit having the above structure is explained with reference to the current and voltage waveforms of the electric power generator 1 shown in FIGS. 2A and 2B, respectively.

Hereinafter, a circuit operation, when the voltage $V_B$ of the battery B is low (the battery B is not sufficiently charged), specifically, when the voltage $V_B$ is lower than a predetermined voltage determined based on a breakdown voltage of the zener diode ZD1, is explained. In the voltage detection circuit 4, a reverse current (from the cathode of the battery B to the anode of the battery B) does not flow in the zener diode ZD1. For this reason, a current does not flow between the base and the emitter of the transistor Q1. Accordingly, the transistor Q1 changes to the off-state. In this case, a current does not flow between the base and the emitter of the transistor Q2, and therefore the transistor Q2 also changes to the off-state. In the switching circuit 3, the gate current is zero, and therefore the thyristors S1 to S3 changes to the off-state (in which a current does not flow from the anode to the cathode). Accordingly, the three-phase AC voltage outputted from the electric power generator 1 is rectified by each of the diodes D1 to D6, and the battery B is charged with the rectified voltage as a charge voltage (a charging period shown in FIG. 2B). In other words, the phase U current shown in FIG. 2A flows through the diode D1, the battery B, and the diode D5. The phase V current shown in FIG. 2A flows through the diode D2, the battery B, and the diode D6. The phase W current shown in FIG. 2A flows through the diode D3, the battery B, and the diode D4. The battery B is charged with the charge voltage that is rectified in this manner.

Hereinafter, a circuit operation, when the battery B is sufficiently charged and the voltage $V_B$ thereof becomes higher than the predetermined voltage, is explained. In the voltage detection circuit 4, a reverse current from the battery B to the zener diode ZD1 flows. Consequently, the transistor Q1 changes to the on-state. Then, in the switch control circuit 5, a current flows between the base and the emitter of the transistor Q2, and therefore the transistor Q2 also changes to the on-state. In the switching circuit 3, a gate current flows in each of the thyristors S1 to S3 through the transistor Q2 and the resistors R1 to R3. Accordingly, each of the thyristors S1 to S3 changes to the on-state (in which a current flows from the anode to the cathode). Therefore, the phase U of the electric power generator 1 shown in FIG. 2A is short-circuited through the thyristor S1 and the diode D5. The phase V shown in FIG. 2A is short-circuited through the thyristor S2 and the diode D6. The phase W shown in FIG. 2A is short-circuited through the thyristor S3 and the diode D4. Consequently, the battery becomes in a non-charged state (non-charging period shown in FIG. 2B).

Further, when the transistor Q2 changes to the on-state as explained above, the current flowing between the emitter and the collector of the transistor Q2 partially flows into the control circuit 6. The capacitor C1 in the control circuit 6 is charged with the current flown into the control circuit 6. When the capacitor C1 is charged, a base potential of the transistor Q1 in the voltage detection circuit 4 is kept high, and therefore the transistor Q1 maintains the on-state. Consequently, the transistor Q2 in the switch control circuit 5 also maintains the on-state. In this case, each of the thyristors S1 to S3 becomes the off-state once when the AC voltage of the electric power generator I becomes negative. However, the transistor Q2 maintains the on-state and therefore the gate electrode flows. Consequently, each of the thyristors S1 to S3 changes to the on-state again when the AC voltage of the electric power generator 1 becomes positive. Thus, each of the thyristors S1 to S3 is controlled to maintain the on-state so that the battery B maintains the non-charged state for a predetermined period (non-charging period shown in FIG. 2B).

Then, when the electric power of the battery B is consumed by an external circuit (not shown) and the like, and the voltage $V_B$ of the battery B becomes lower than the predetermined voltage again, the reverse current does not flow in the zener diode ZD1. Consequently, the transistor Q1 in the voltage detection circuit 4 changes to the off-state, and the transistor Q2 in the switch control circuit 5 also switches to the off-state. For this reason, the capacitor C1 in the control circuit 6 discharges the above electric charge. Accordingly, the base of the transistor Q1 in the voltage detection circuit 4 is reverse-biased. In this state, even if the reverse current flows in the zener diode ZD1 again, the transistor Q1 maintains the off-state since the base of the transistor Q1 is reverse-biased. Consequently, the transistor Q2 in the switch control circuit 5 maintains the off-state. Therefore, there is a sufficient period of time in which the gate current of each of the thyristors S1 to S3 is zero. For this reason, each of the thyristors S1 to S3 can properly change to the off-state during that period of time. Thereafter, the transistor Q2 continuously maintains the off-state, and therefore each of the thyristors S1 to S3 maintains the off-state. Thus, each of the thyristors S1 to S3 is controlled so as to change from the on-state to the off-state and then maintain the off-state, while the base of the transistor Q1 in the voltage detection circuit 4 is reverse-biased, in other words, while the capacitor C1 in the control circuit 6 discharges. The battery B is charged in a similar manner as explained above while each of the thyristors S1 to S3 maintains the off-state.

Thus, the transistor Q2 maintains the off-state while the capacitor C1 discharges. Therefore, each of the thyristors S1 to S3 can properly change to the off-state during that period. Accordingly, a case, in which each of the thyristors S1 to S3 is always in the on-state and therefore the battery B cannot be charged, can be prevented.

Although an embodiment of the present invention has been explained in detail with reference to the accompanying drawings, the specific structure of the present invention is not limited thereto, and may be modified and changed without departing from the scope of the invention.

For example, the switching circuit 3 may include switching elements of a transistor, such as MOSFET and IGBT, in lieu of the thyristors S1 to S3.

Although the battery charging circuit using the three-phase AC generator has been taken as an example for explaining the embodiment, the embodiment can be applied to a voltage stabilizing circuit for a three-phase AC generator.

I claim:

1. A battery charging circuit comprising:
    a rectifier circuit for rectifying a three-phase alternate-current voltage outputted from an electric power generator and generating a charge voltage for charging a battery;
    a voltage detection circuit for detecting that a voltage of the battery becomes equal to or higher than a predetermined voltage;
    a switching circuit for charging, in an off-state, the battery through the rectifier circuit and for short-circuiting, in an on-state, the electric power generator through the rectifier circuit;
    a switch control circuit for switching the switching circuit to the on-state when the voltage detection circuit detects that the voltage of the battery becomes equal to or higher than the predetermined voltage; and a control circuit for controlling the switching circuit to switch from the on-state to the off-state and to maintain the off-state, and controlling the switching circuit to switch from the off-state to the on-state and to maintain the on-state, wherein the control circuit comprises a capacitor that is charged when the switch control circuit controls the switching circuit to switch to the on-state, the capacitor discharging when the switch control circuit controls the switching circuit to switch to the off-state, the voltage detection circuit comprises a first transistor, a base of the first transistor being reverse-biased by the capacitor discharging, the switch control circuit comprises a second transistor, a base of the second transistor being connected to a collector of the first transistor, the switch control circuit controlling the on-state and the off-state of the switching circuit based on a collector current flowing to the collector of the first transistor, and the capacitor in the control circuit is connected between the base of the first transistor and a collector of the second transistor.

* * * * *

UNITED STATES PATENT AND TRADEMARK OFFICE
CERTIFICATE OF CORRECTION

| | | |
|---|---|---|
| PATENT NO. | : 8,415,929 B2 | Page 1 of 1 |
| APPLICATION NO. | : 12/865941 | |
| DATED | : April 9, 2013 | |
| INVENTOR(S) | : Tabuta | |

It is certified that error appears in the above-identified patent and that said Letters Patent is hereby corrected as shown below:

On the Title Page:

In item (73), please delete the assignee information and replace as follows:

-- (73) Assignee:    Shindengen Electric Manufacturing Co., Ltd., Tokyo (JP) --

On the Title Page:

The first or sole Notice should read --

Subject to any disclaimer, the term of this patent is extended or adjusted under 35 U.S.C. 154(b) by 262 days.

Signed and Sealed this
Twenty-ninth Day of October, 2013

Teresa Stanek Rea
*Deputy Director of the United States Patent and Trademark Office*